United States Patent

[11] 3,598,289

| | | |
|---|---|---|
| [72] | Inventor | Lannie F. Norris<br>Hot Springs, Ark. |
| [21] | Appl. No. | 834,739 |
| [22] | Filed | June 19, 1969 |
| [45] | Patented | Aug. 10, 1971 |
| [73] | Assignee | Norris Dispensers, Inc.<br>Minneapolis, Minn. |

[54] DISPENSING TUBE VALVE WITH CUTTER
5 Claims, 5 Drawing Figs.

[52] U.S. Cl. .................................................. 222/80,
29/213, 30/124
[51] Int. Cl. .................................................. B67b 7/30
[50] Field of Search.......................................... 222/80, 82,
83, 83.5, 88; 30/124, 131, 134, 135; 29/213

[56] References Cited
UNITED STATES PATENTS
1,401,968  1/1922  Dorner ........................ 222/83
2,808,185  10/1957  Norris ......................... 222/556

*Primary Examiner*—Robert B. Reeves
*Assistant Examiner*—Francis J. Bartuska
*Attorney*—Williamson, Palmatier and Bains ABSTRACT: In the art of flexible, originally closed, dispensing tubes controlled by a pinchcock valve mechanism, such as are employed in refrigerated bulk drink dispensers, a quickly attachable cutting device having a body which is readily connectable with certain elements of the overall pinchcock valve mechanism. In its preferred form the body of the cutting device (after removal of the swingable pinchcock valve body from its seat), temporarily replaces the valve body and thereby positions a movable cutter element in a predetermined relation closely below the normal valve-pinch area of the dispensing tube. The structure of this invention positively prevents irregular severing of dispensing tubes far below the pinchcock seat, which often occurs in the usual operation of bulk milk and other liquid dispensers.

PATENTED AUG 10 1971

INVENTOR.
LANNIE F. NORRIS

BY
Williamson, Palmatier & Bains
ATTORNEYS

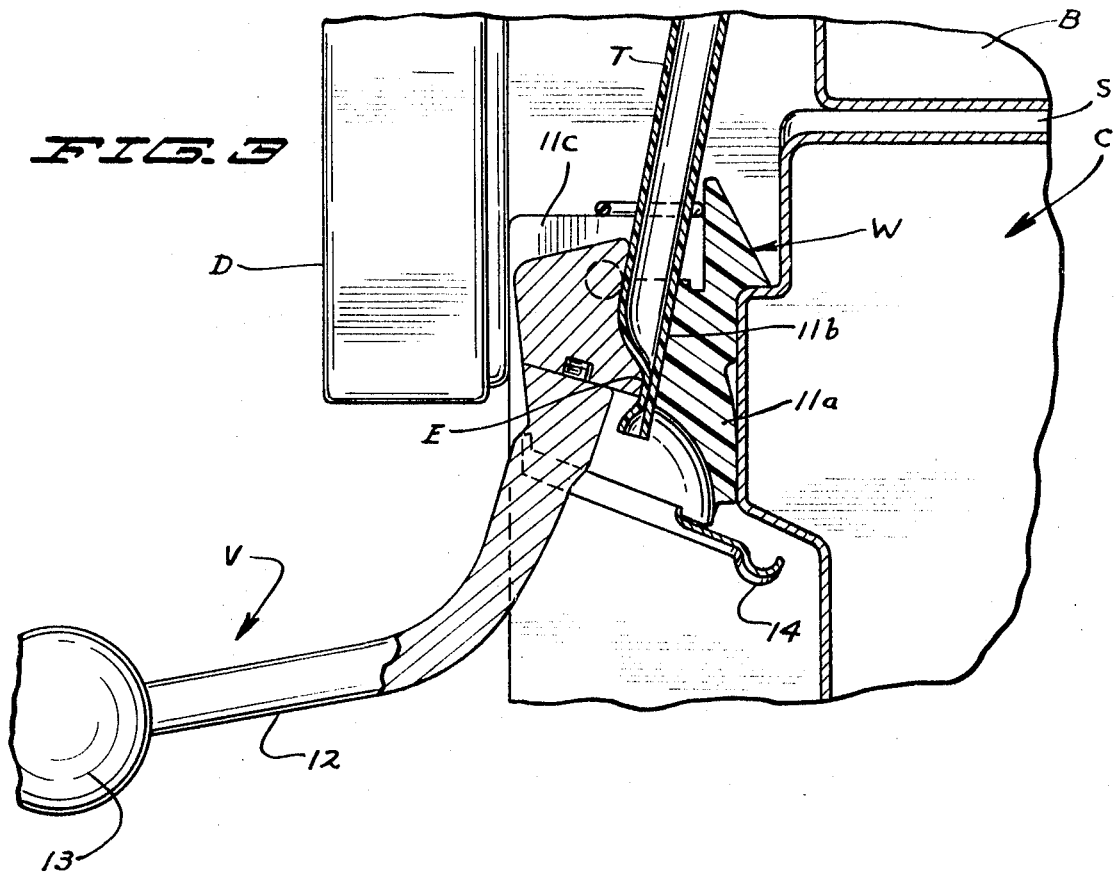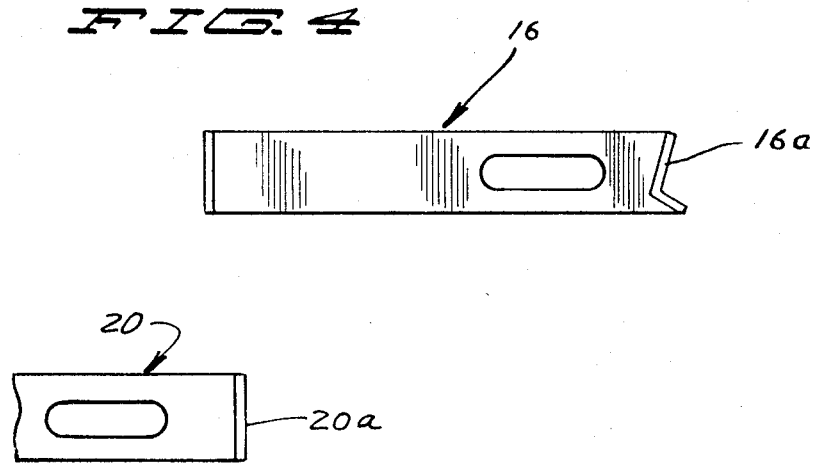

DISPENSING TUBE VALVE WITH CUTTER

This invention relates to a cutting device for predeterminatively severing depending tubes for length so that such tubes may be usable for discharge of liquid therethrough in conjunction with valve structure of the pinchcock type as used in bulk milk and other liquid dispensers and the like.

Bulk liquid dispensers mounted in refrigerated cabinets are very widely used in restaurants, schools, factories, and the like for dispensing milk and other liquids. The bulk tanks for holding the milk or other liquid (usually constructed of stainless steel or a plastic bag of large dimensions reinforced by corrugated material or the like) have in the sump portions thereof a nipple to which is attached a depending flexible and disposable dispensing tube, the tube being normally closed at its lower end when the tank is filled, and of course until the tank with tube is disposed in a refrigerated cabinet in a restaurant or the like, for use.

Conventional pinch-type valves for shutting off and controlling flow of liquids are usually weight-actuated by an outwardly projecting handle member and have a valve body with projecting lip for pinching the tube at a predetermined level below the bottom of the mounted tank. To permit ready sterilization of the entire pinchcock valve structure, for sanitary reasons the valve bodies with handles are usually removable from an abutment seat usually in the form of a type of a well which is positioned in the refrigerated cabinet somewhat below the bottom of the tank mounting.

In such refrigerated bulk liquid dispensers, the tube, usually constructed of sterilized rubber of soft plastic, is sheared off by an attendant at the restaurant, club or school and of course variable distances and lengths of tubes remain, often a considerable length of the tube extending below and beyond the shutoff area. Such extension usually contains residual milk and in any event is subjected to dust and germs.

It is an object of my present invention to provide a cutting device of the class described which will predeterminatively enable the user to sever the tube just below the pinched inoperative position of the valve, thereby eliminating the said present objectionable effects.

It is a further object to provide an economical compact severing device which has a body readily connectable in a predetermined manner with elements of the pinchcock valve mechanism to thus position a severing element or knife carried thereby for cutting the tube at the most desirable location.

More specifically it is an object to provide a cutting device of the class described wherein the body for the device is readily replaceable in the mounting or journals for the ordinary weight-controlled pinchcock valve device, thus enabling the improved device to be employed in thousands of milk and liquid bulk dispensing apparatus now in use.

The foregoing and other objects of this invention will be more apparent from the following description made in connection with the accompanying drawings, wherein:

FIG. 3 is a cross section similar to FIG. 2, showing the journaled valve member replaced for operation of the dispenser after the dispensing tube has been precisely severed by my mechanism shown in FIGS. 1, 2 and 4;

FIG. 4 is a top plan view of a preferred shearing blade, and

FIG. 5 is a similar detail plan view of another alternative type of shearing blade.

Figure 1:
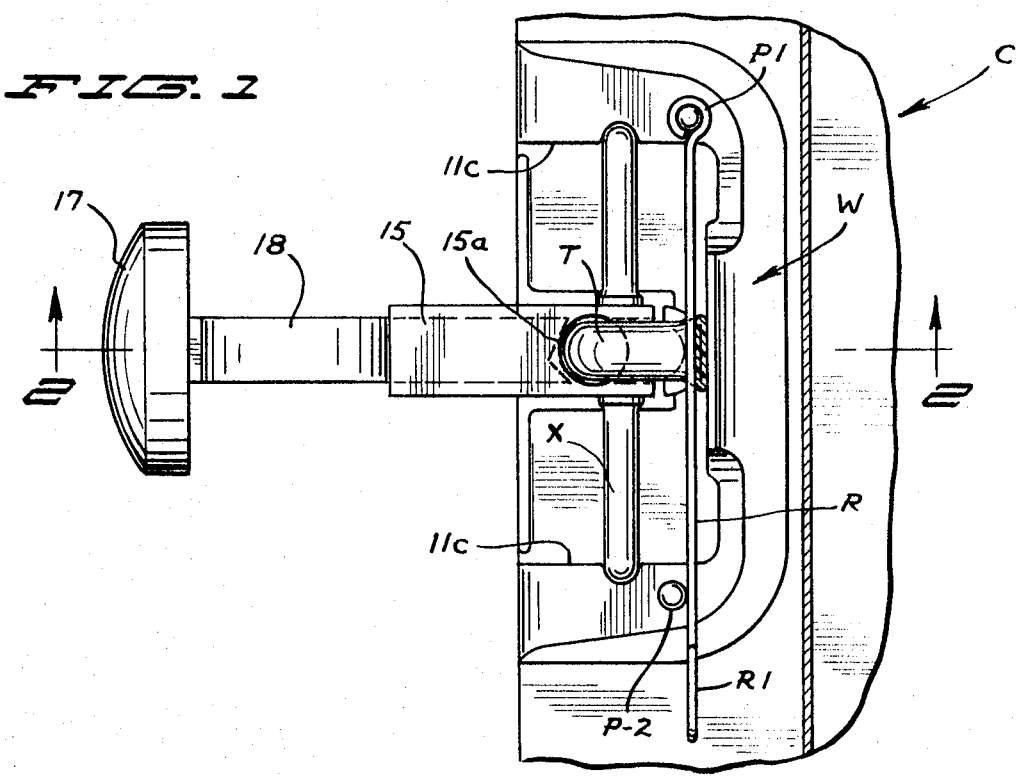
FIG. 1 is for the most part a top plan view showing lower, front and liquid-discharge portions of a well known type of refrigerated bulk drink-dispenser with the swingable body and weight-actuated portion of the valve removed, but replaced by an embodiment of my present invention.

Refrigerated bulk-drink dispensers of well known commercial type are disclosed and illustrated in my U.S. Letters Pat No. 2,808,185 and my copending patent application, Ser. No. 747,253, now U.S. Pat. No. 3,532,255.

Referring now to the embodiment of my invention illustrated, the forward and lower portion of the conventional type of refrigerated cabinet indicated as an entirety by the letter C, is illustrated having a front door D with sealed relation to an opening in the front of the cabinet. The cabinet includes a horizontal shelf S upon which the bulk container or tank B of conventional type is supported. The bulk tank B has a conventional, depending, short nipple N to which the upper end of a flexible conventional dispensing tube T is secured, said tube projecting downwardly through a generally rectangular well W which has a back flange 11a adapted to lightly engage against an intermediate portion of the rear of the tube and which has a central flat valve seat portion 11b against which the edge E of a pinchcock valve body V is adapted to abut with the soft tube pinched between the edge and said seat. The valve body V has intermediate terminal trunnions X which seat in grooves 11c formed in the upper and side edges of the well W. The valve body has rigidly affixed thereto the outwardly projecting handle 12 which carries at its outer end a weight element 13. The valve body also carries below the pinchcock edge E and transversely disposed at the bottom of well W, a plate 14 to which the open end of the flexible tube extends.

Figure 2:
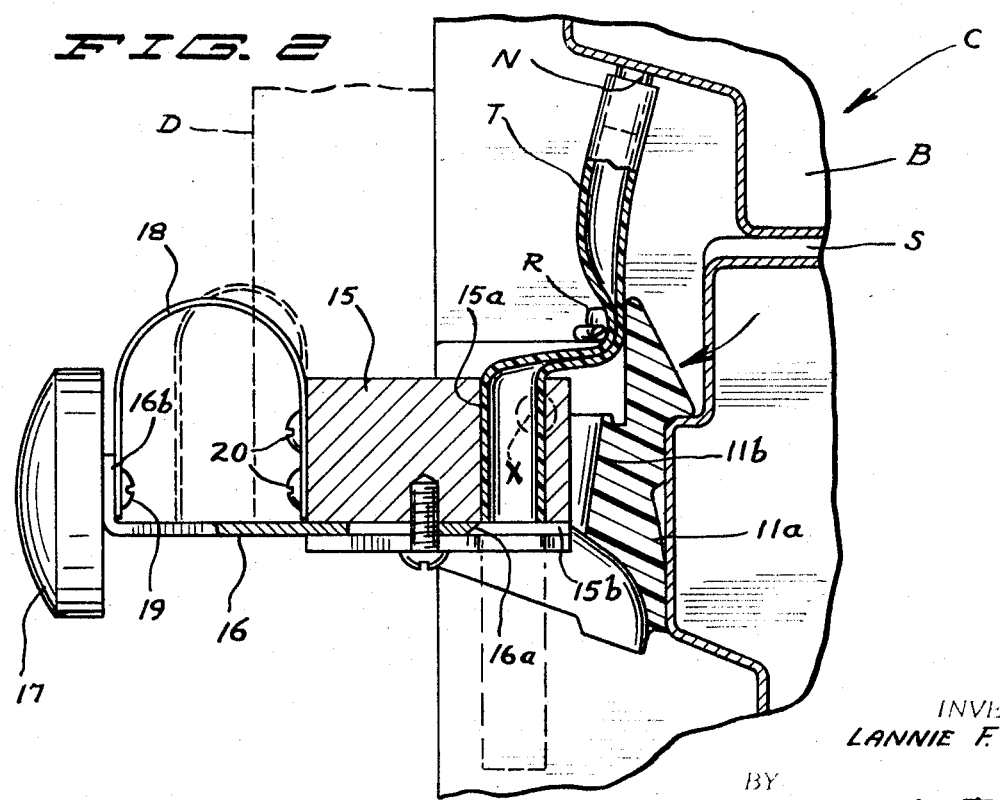
FIG. 2 is a cross section taken substantially along the line 2-2 of FIG. 1, showing my improved cutter mechanism operatively connected for use with the well through which the flexible dispensing tube extends.

FIGS. 1 and 2 shown the entire valve structure V removed by simply lifting the trunnions X out of the journal grooves and in its place an embodiment of my cutter mechanism is mounted. The mechanism, as shown, comprises a rectangular blocklike body 15 having a vertical bore 15a formed through the inner end thereof. The bore 15a is of a diameter to nicely and internally accommodate the conventional flexible tube T. Before the tube T is threaded through the bore 15a it is temporarily pinched above the valve body V by suitable means such as a wire or rod R pivoted at one end to a post P-1 and having a free end R-1 abutted behind a second post P-2, said posts being attached to the side and upper edges of the well W. The body of my cutter near its bottom has a horizontal slide slot 15b formed therein which is slidably mounted for reciprocation, a cutter blade 16. The cutter or strip 16 at its inner end has a sharpened, beveled and angularly shaped knife edge 16a with an apex positioned out of longitudinal center and preferably with the two edges which intersect being angled to the centerline at angles approximating 75° and 25° respectively. The outer end of the cutter blade 16, as shown, has an upturned attachment arm 16b to which is rigidly secured a handle or knob 17 to facilitate manipulation of the blade. Resilient means such as leaf spring 18, in curved, substantially inverted U-shaped is interposed between the attachment arm 16b and the outer end of the cutter body 15, being suitably secured at its respective ends by such means as threaded bolts 19 and 20 respectively.

A successful, alternate type of cutting edge is shown in FIG. 5, where the beveled cutting edge 20a is perpendicular to the centerline of the blade 20.

OPERATION

As shown in FIGS. 1 and 2, a bulk milk tank B containing drinkable liquids such as milk or the like, has been properly positioned within the refrigerated cabinet C, supported from its bottom on the horizontal shelf S. The tank is provided with the quickly detachable, disposable, flexible dispensing tube T, having when the tank is delivered, a closed end indicated by dotted lines in FIG. 2. The depending tube T has been passes through the well W and its lower end extended to substantially the position shown in dotted lines in FIG. 2.

Thereafter, the pinch-retaining rod R was applied as shown in FIG. 1, to temporarily pinch and close the intermediate portion of the tube. It will of course be understood that prior to such operation the swingable pinch-valve structure shown in FIG. 3 had been removed from the cabinet to permit accommodation of my improved tube-cutting mechanism. The pins or trunnions X of the cutter body interfitted and were supported in the identical grooves formed in the upper edges of the sidewalls of well W, thus supporting my entire cutter structure and causing the inner end of the body 15 to be properly positioned for threading of the tube T through the accommodating bore of the body 15a. Thus with such mounting of the cutting mechanism utilizing the portions or semijournals formed in the sidewalls 11c of the well structure, the cutter blade 16 is disposed at a precise, predetermined position relatively to the level of the valve edge E of the valve body.

With the cutter mechanism mounted as shown in FIGS. 1 and 2, the handle 17 is pressed inwardly causing the efficient cutter edge 16a to completely sever the tube T, as clearly indicated by the full lines in FIG. 2. When the handle 17 is released, the U-shaped leaf spring 18 returns the blade 16 to the normal retracted position.

Thereafter, the cutter device is quickly lifted from its support and removed from the refrigerator cabinet, and the pinchcock valve mechanism V then is properly positioned in its usual operating manner. Thereafter, the temporary pinch rod R is released at its free end from the post P–2; the tube down to the pinch-close area as shown in FIG. 3, is released.

From the foregoing description and the drawings, including FIG. 3, it will be seen that the lower portion of the tube has been removed and sheared at a point very closely below the effective closing area illustrated in FIG. 3. The extent of the tube below said normal pinch area is so short that no milk or other liquid will stand in the end of the tube.

Prior to this invention the tendency of operators of refrigerated bulk dispensers, generally was to cut the tube by knife or scissors not only some distance below the intermediate portion of well W, but usually some distance below the guard bottom plate 14 of the valve body. This variable and careless cutting of tubes usually left a short column of milk or other liquid in the lower end of the tube and much of the tube was exposed to germs, dust and other deleterious substances. With my structure t the said objections have been eliminated and assurance of precise cutting of the flexible tube and removal of the closed end thereof is assured.

It is of course to be understood that while I have illustrated an embodiment of my invention applied to a widely used type of refrigerated bulk dispenser with disposable dispensing tube, the invention is equally applicable for quick attachment for various types of dispenser mechanisms which employ depending or horizontal tubes which may be readily severable by reciprocating knife edge.

What I claim is:

1. A cutting device for predeterminatively severing a depending tube below a pinchcock valve or the like having in combination,
   a body having mounting means connectable in a predetermined manner with elements of the overall pinchcock valve mechanism,
   said body having an inner end disposed adjacent said flexible tube,
   said body having a recess for embracing said depending dispensing tube,
   and having a transversely disposed cutting element slidably mounted in said body and provided with an inner knife edge for severing said tube at an area predetermined and just below the effective closure function of said pinchcock valve,
   said cutting element having an outer end projecting beyond and manipulatable from the outer end of said body.

2. The structure and combination defined in claim 1,
   and means for returning said cutting element to a retracted inoperative position after a tube is severed.

3. The structure and combination set forth in claim 1, wherein
   said pinchcock valve includes a removable valve-body-member swingably mounted in spaced supports,
   said cutter device body having a pair of spaced elements for mounting in said spaced supports,
   and the relation of said spaced elements to said cutter element predetermining the length of said dispensing tube cut.

4. The structure set forth in claim 1 wherein,
   said pinchcock valve structure includes a generally boxlike, open-front well having a bottom wall through which said depending tube extends,
   said well having spaced sidewalls provided with horizontally aligned semijournals at the upper edges thereof,
   and said cutter body carrying horizontal supporting journals at the sides thereof spaced to fit into said semijournals.

5. The structure set forth in claim 4, wherein,
   means are attached to the upper portion of said well for temporarily pinch closing said tube prior to a tube-cutting operation.